United States Patent [19]
Bosco

[11] 3,918,390
[45] Nov. 11, 1975

[54] VERSATILE BOOKMARK

[76] Inventor: Joseph Bosco, 31 Summer St., Everett, Mass. 02149

[22] Filed: Oct. 7, 1970

[21] Appl. No.: 78,804

[52] U.S. Cl. .................................. 116/119; 281/42
[51] Int. Cl.² .......................................... B42D 9/00
[58] Field of Search .............. 116/119, 133; 235/88; 40/115; 281/42; 35/31 B, 74; D19/34

[56] References Cited
UNITED STATES PATENTS

| | | | |
|---|---|---|---|
| 670,766 | 3/1901 | Carleton | 116/119 |
| 738,376 | 9/1903 | Thompson | 116/119 |
| 828,353 | 8/1906 | Walsh | 116/119 |

*Primary Examiner*—Richard C. Queisser
*Assistant Examiner*—Marcus S. Rasco

[57] ABSTRACT

A bookmark indicating pages 1–999 with a circular rotatable dial mounted on an outer stationary plate. Two rows of numerals are printed on the outer circumference of rotatable dial. The stationary plate has a row of numbers printed circumferentially of the rotatable dial an radially allignable with the numbers on the rotatable dial.

2 Claims, 2 Drawing Figures

U.S. Patent   Nov. 11, 1975   3,918,390
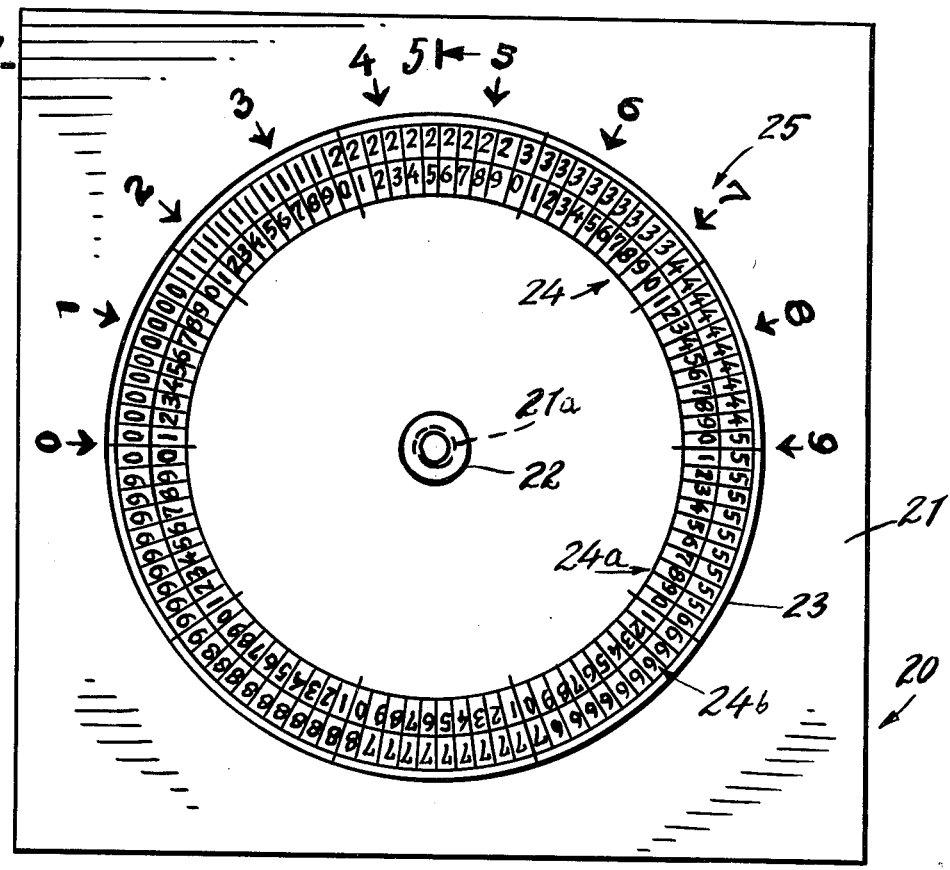
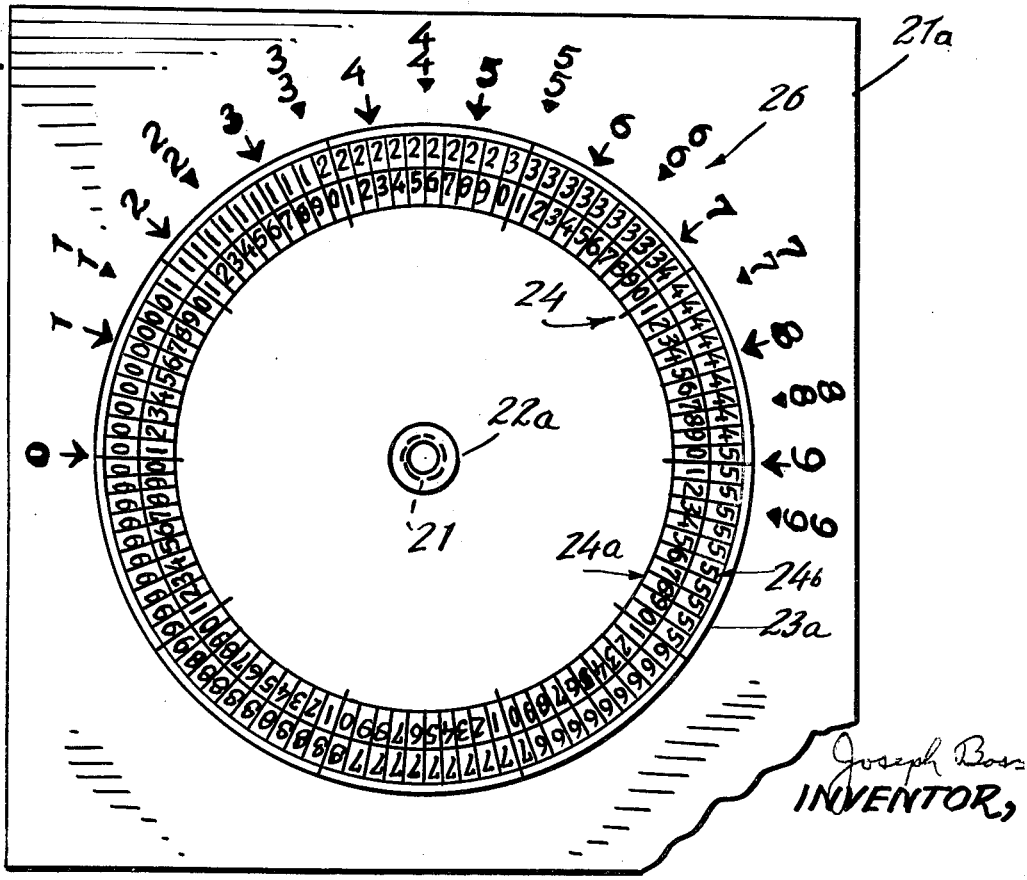
Joseph Boss
INVENTOR,

VERSATILE BOOK - MARK

THE PRESENT INVENTION relates to book-marks, and more particularly it relates to a book-mark device which will register or record the reading page by means of a numbered dial. More particularly the invention is provided with a circular dial upon which are imprinted or embossed numerals. The dial in question may be mounted to rotate upon a stationary base or a back piece which may carry a number of indicia, arrows, and index numerals. The arrows aforesaid may register with the numerals upon the dial for the purpose of registering a book page.

In general this invention is a simple device which holds an inner superimposed circular piece of plastic or a disk which may be numbered from "00" to "99" in vertical sequence. As a result of this numerical arrangement the inner circle may be rotated by hand and by means of an eylet which is mounted in its center. Thus rotated the disk may reach the number "999." The various registered numbers from "00" to "99" may be recorded by matching the inner circule of numerals (on the plastic disk) with an arrow (or arrows) registering from "0" to "99" and with numerals "1" to "9," to reach the number "999." In like manner a sequence of numbers from "1000" to "9,999" may be reached by either having a second series of numerals on the bottom of the plastic disk starting with "00" to end with " 99." The second series of numbers for the thousands may commence after the hundred series or in between each 100 numeral of that particular series. The thousand (for easy identification purposes) series could also be of a different color.

The stationary base or the back piece in the device may be formed of plastic (paper, or thin tin) with its top being formed to fold over so as to form a flat flap to engage the top of either the front or back cover of the book or of any other page for that matter.

From the above description it becomes apparent that when a person interrupts his reading he may find in the book the place to continue his reading material by merely referring to the dialed number which was registered at the time when he stopped or discontinued reading. Speed and accuracy is the result. The device dispenses with all other cumbersome methods of finding one's place in the book.

The device, in addition, to its utilitarian value as a book mark also may be used for advertising purposes. The superimposed disk which rotates may be the means of conveying a message by a person or a company dispensing the book mark aforesaid. Or the center of the rotating disk may be used for advertising purposes generally.

One object of this invention is to provide a device of the class described which may be easy to produce, easy to operate, and very inexpensive to manufacture.

A second object of the present invention is to provide a back piece formed preferably of plastic, and a circular member or disk to rotate upon said piece. Said back piece being in turn provided with a folded section to serve as a supporting flap.

Another object of the present invention is to provide a numbered disk mounted to rotate upon said back piece, the numbers upon said piece registering with a set of arrows which are inprinted on the upper surface of said back piece for registering purposes.

An additional object of the present invention is to provide a disk which may be mounted to rotate upon a base by means of an eylet in the center. Said disk being provided with numerals from "0" to "999" for the purpose of registering the reading page.

Another object of this invention is to provide a page registering device which may be so constructed as to be an integral part of the book cover.

A further and additional object of this invention is to provide said registering die with means to permit the rotation of said dial in said book for page registering purposes.

These and many other objects of the invention will become apparent as the following description of the specification proceeds, a preferred embodiment of which is illustrated in the accompanying drawings, by way of example only, wherein:

FIG. 1 is a front elevational view of the device showing the embodiment of the present invention and the manner in which the numerals are inprinted upon the disk an the indicating arrows on the back piece;

FIG. 2 is a view similar to the one shown in FIG. 1, in this case however, showing a modified arrangement of the position of the indicating arrows upon the back piece;

In describing the invention in detail, references will be made to the accompanying drawings where like character numerals denote like or corresponding parts throughout the several views.

It is understood, however, that the present form of disclosure is merely for the purpose of illustration, and there might be various modifications thereof, without departing from the spirit of the invention as hereinafter set forth.

Referring now more particularly to the book mark device 20, best shown in FIG. 1, made in accordance with the present invention, it preferably comprises, in combination, the plastic flat-shaped body or supporting member or bracket 21, which may be rectangular in shape, square or somewhat elongated. The center portion thereof may be provided with a punched eyelet hole 21a which may hold and support a conventional type of eyelet rivet 22.

A circular piece of plastic or a dial member 23 may be mounted to rotate freely upon the supporting member 21. The dial 23 may be provided with an etched, imprinted or embossed circular row (or rows) of numbers 24 and special scale gradations which may be subdivided into a plurality of equal-distant rectangular shaped niches in substantial vertical sequences. These box-like sections may be provided with numerals indicated in repetitive form and numerical sequence. For instance, say, these numbers may be applied upon the dial 23 in two circumferential rows, an inner row 24a, and an outer row 24b, substantially as indicated.

The numerals in the outer row 24b are imprinted in a sequence beginning with 0000000000, ten times, then following with 1111111111 ten times, to 9999999999, ten times. The inner circle 24a carries numerals of the sequence, 0, 1, 2, 3, to 9, in every group and being arranged substantially under and below the numerical sequence carried in the circle above (see FIG. 1).

FIG. 2 is a modification of FIG. 1. In the latter case the supporting section 21a may be provided with a pair of rows of indicial numerals and arrows (instead of one) which may be numbered from 1 to 9, in the inner row 26, and from 1 to 9 in the outer row 27. The disk 23a may be freely rotated upon the eyelet 22a, substantially in like manner as already described and shown in FIG. 1, wherein the disk 23a rotates upon the eyelet 22 above described.

To register additional page numbers from (1000) to (9999) the outer row of stationary numerals 26 is used instead, as indicated already in FIG. 2, which is a modification of FIG. 1. The page numbers in this latter case are registered in similar fashion as above described for FIG. 1. FIG. 1 shows a registering device to register pages from (0) to (999), and FIG. 2 shows a registering device to register pages from (1000) to (9999), otherwise both devices are substantially of the same general construction.

While FIGS. 1 and 2 inclusive, show illustrated in detail the manner in which my page registering dial may be utilized as a book accessory affixed directly to the cover of a book during the process of manufacture.

Minor changes in shape, size and materials, and rearrangement of parts, may be resorted to in actual practice as long as no departure is made from the invention claimed.

Having described my invention, what I claim is the following:

1. In a device of the class described for registering pages 1 through 999 of a book comprising in combination:
   a. a circular rotatable dial mounted for rotation on an outer stationary plate;
   b. two rows of indicia numerals printed on the outer circumference of said rotatable dial;
   c. said outer row including ten groups of numbers beginning with zero and ending with nine in a series, each group consisting of ten of each number;
   d. said inner row having ten groups of numerals running from zero to nine in series;
   e. said first zero of the outer row being aligned radially with a first zero of said inner row;
   f. said stationary plate having a row of numbers from zero to nine printed thereon circumferentially of said rotatable dial and radially alignable with said numbers on said first and second rows of said rotatable dial;
   g. said numbers on said plate being spaced at least over one quarter of the circumference of said rotatable dial.

2. The device of claim 1 wherein said numbers on said plate are spaced over 180°.

* * * * *